2,954,750

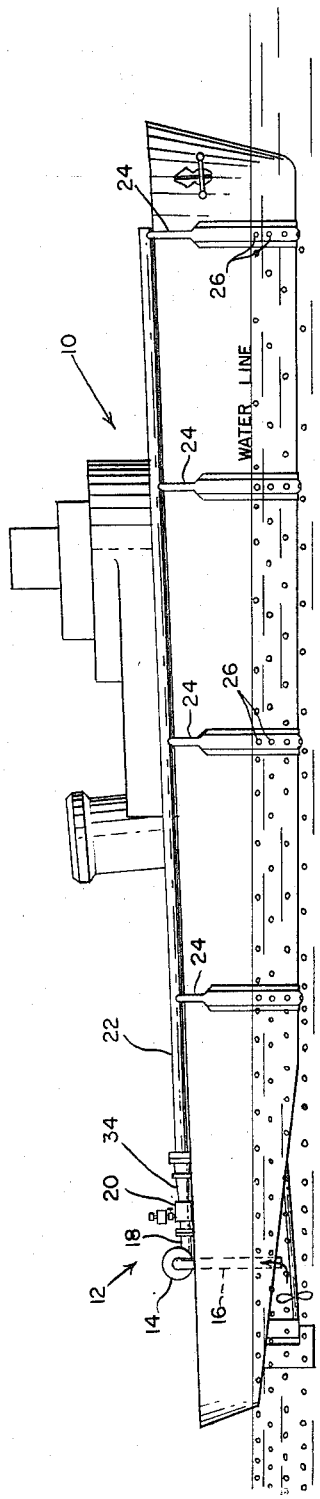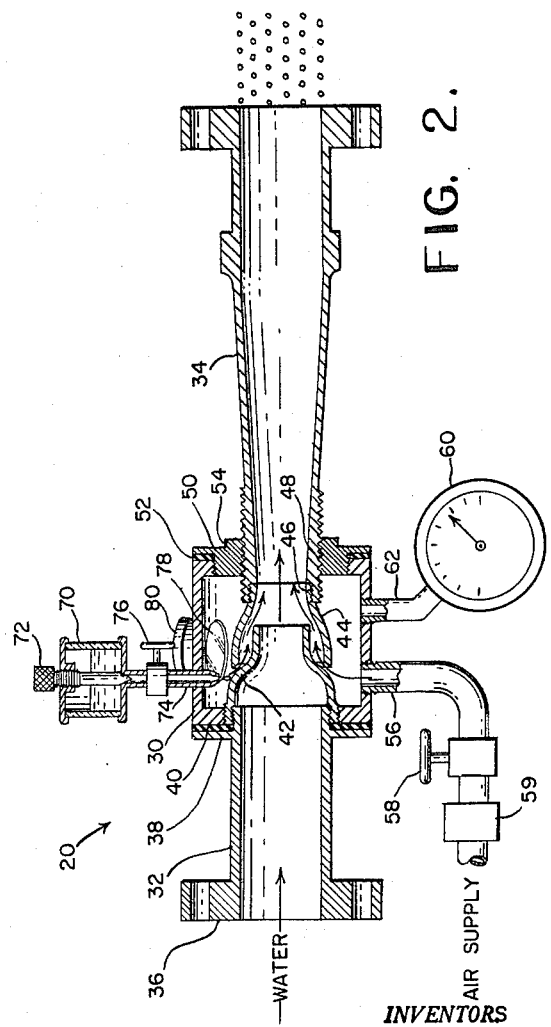
Oct. 4, 1960 S. F. CRUMP ET AL 2,954,750
MIXER NOZZLE
Filed Nov. 17, 1954
FIG. 1.
FIG. 2.
INVENTORS
STUART FAULKNER CRUMP
LEONARD J. GIUFFREDA
ROBERT A. RAPP
BY
B. L. Zangwill
ATTORNEYS

United States Patent Office 2,954,750
Patented Oct. 4, 1960

MIXER NOZZLE

Stuart F. Crump, Rockville, Leonard J. Giuffreda, Bethesda, and Robert A. Rapp, Rockville, Md., assignors to the United States of America as represented by the Secretary of the Navy Filed Nov. 17, 1954, Ser. No. 469,574

10 Claims. (Cl. 114—.5)

(Granted under Title 35, U.S. Code (1952), sec. 266)

The device described herein may be manufactured and used by or for the Government of the United States of America for governmental purposes without the payment of any royalties thereon or therefor.

The present invention is an improvement relating to apparatus for reducing sound radiation by means of aerated water surrounding the hull of a vessel.

In radiant energy problems, it is a well known and accepted principle that any change in the characteristics of the transmission medium will cause a reflection of at least a portion of the energy being transmitted, and that the amount of energy which is reflected will depend upon the degree to which the transmission medium is changed. It will be readily apparent that the energy transferred through the new medium will be considerably less than that emanating from the source.

It is known that the radiation of noise from a ship into water can be reduced by interposing between the hull and water, a layer of small bubbles of gas which reflect a large percentage of sound transmitted through the hull back into it. In order for a layer of aerated water adjacent the hull to be effective in reflecting the vessel noises, the density of the layer must be appreciably different from both that of the hull and the water, and the layer must remain intact over the portion of the hull to be shielded. The sound energy passing through the bubble shield however, is diffused by the irregular surface of the layer and it is therefore rapidly absorbed or attenuated by the surrounding water.

The effective layer of bubbles of gas or aerated water adjacent the hull is obtained by mixing air and water into a pseudo-emulsion containing a tremendous number of fine bubbles, and then forcing the pseudo-emulsion thus formed from a perforated conduit attached to the exterior portions of the vessel below the water line. The small bubbles thus formed have a very high surface tension and do not coalesce with each other, and because of their low buoyancy, they rise to the surface very slowly so that the layer thus formed remains in contact with the surface of the vessel during its travel through the water. The process is a continuous one and the vessel is thereby effectively shielded so long as the system is in operation.

The improvement in the present invention resides in the reduction of sound radiation by the utilization of a detergent for forming a dense uniform bubble screen, the density of which is adjustable according to different ratios of air, water and detergent used in the emulsion or mixture. A particularly effective bubble screen is provided when the detergent is added to the air-water emulsion. An additional improvement resides in the provision of an adjustable air gap at the venturi throat of the mixer.

It is therefore an object of the invention to provide a detergent in an air-water mixture utilized for forming the bubble screen adjacent a vessel.

A further object of the invention is the provision of a venturi tube in a mixer having an adjustable throat for providing a wide range of air-water ratios used in operation of the apparatus.

A still further object of the invention is the provision of an observation window for observing the mixing action of an emulsion and for providing access to the interior of the apparatus for cleaning of the parts.

Other objects and many of the attendant advantages of this invention will be readily appreciated as the same becomes better understood by reference to the following detailed description when considered in connection with the accompanying drawings wherein:

Fig. 1 is a view in elevation of a ship showing a bubble screen for attenuating noises emanating from the ship; and Fig. 2 is a cross-sectional view in elevation of a venturi tube in a mixer nozzle used in the system of the present invention.

Referring now to the drawings wherein like reference characters designate like or corresponding parts throughout several views, there is shown in Fig. 1 a ship 10 carrying bubble making apparatus 12 for providing a bubble screen extending along the exterior length of the ship. The apparatus comprising the invention consists of a pump 14 taking a suction from sea through an intake line 16. The pump discharges through outlet 18 into a mixer nozzle 20 where the proper ratios of air, water and detergent are combined for producing a uniform mixture of minute air bubbles in the water for forming the bubble screen. A pair of water carrying lines or headers 22 are connected to the discharge side of the mixer nozzle and are positioned on the deck of the ship extending from the stern to the bow. Interconnected with these headers are a plurality of branch lines 24 provided with a plurality of small orifices 26 positioned below the water line of the ship. When the emulsion is pumped through the system and forced through the discharge orifices 26, a bubble screen consisting of an innumerable number of dense, uniform bubbles is produced which forms a protective screening lengthwise of the vessel as it moves through the water.

Referring more specifically now to the mixer nozzle illustrated in Fig. 2, there is shown a coupling 30 having an inlet and outlet for respectively receiving a connector 32 and a receiving or discharge nozzle 34. The connector 32 is provided with a member 36 on one end adapted for connection to the discharge line 18 from the pump, and is equipped with a flange 38 on its other end for urging a gasket 40 into engagement with coupling 30 thereby forming a fluidtight fit. An entrance nozzle 42 having a decreasing diameter is provided with exterior and interior threads on one end for respectively engaging mating threads on the coupling 30 and the forward end of connector 32. The discharge nozzle 34 has a receiving member 44 attached to the inner end thereof which is of sufficient length and diameter to completely surround the entrance nozzle 42. In order to permit small changes in the air gap between the entrance nozzle and receiving member 44 of the discharge nozzle, the latter is made longitudinally adjustable in the coupling 30 by threads 48 which are adapted for mating with like threads on the coupling.

An end cap 50 is threadably mounted on the discharge nozzle 34 at the downstream end of the receiving member, and serves the dual purpose of locking the discharge nozzle 34 in a fixed position, and forming a water tight fit with coupling 30 by compressing a gasket 52 between the side of coupling 30 and the inner side of end cap 50. Nut 54 is integrally formed on a side of end cap 50 for receiving a tool capable of turning the end cap relative to coupling 30. Air is supplied to the coupling from a source (not shown) through an air supply inlet 56 attached to one side of the coupling and is controlled by a control valve 58 interposed in the air supply line. In order to determine the proper rate of air flow, a rotameter 59 is inserted in the air supply line 56. Air pressure gauge 60, attached to coupling 30 by means of a pipe 62, measures the air pressure in the coupling.

The coupling is further provided with a detergent supply comprising a container 70 having its outlet controlled by a needle valve 72. Interposed between container 70 and inlet 74 into the casing is a detergent control valve 76 which serves to aid the needle valve 72 in controlling flow of detergent to the coupling. It will be noted that the needle valve in detergent container 70 permits detergent to drop on to a slanted portion of the entrance nozzle 42 where it is drawn into the throat of the nozzle by air supplied through air supply inlet 56. The detergent and air are mixed with water flowing through the entrance nozzle to form an emulsion which ultimately is delivered through discharge orifices 26 positioned along the hull of the ship.

In order to provide visual means for observing the mixing action in coupling 30, a viewing window 78 is fitted in container 80 affixed in a side of the coupling. Further, the container 80 is removable, thereby permitting access to the interior of coupling 30 for cleaning the parts.

The mixer nozzle can be designed for either a specific or variable water flow and in any event, a flow measuring meter can be installed in the system for determining the flow of water therethrough. In a specific application, the detergent flow into the mixer was regulated at approximately $1/20,000$ of the water flow, that is, one part in twenty thousand by volume, and the air gap set at $1/8$ inch for producing a bubble screen having dense, uniform bubbles throughout. The adjustability features of the mixer nozzle provides for extreme versatility in the system. For example, the apparatus is capable of producing bubble screens having air-water ratios as high as 0.40 to 0.50 and the addition of a detergent to the mixture enhances the uniformity and density of the emulsion.

In operation, the air gap between the entrance nozzle 42 and the inside lip of the receiving member 44 is adjusted to a value corresponding to the amount of air desired in the mixture, usually about $1/8$ inch. Pump 14 is started for providing a given water flow and discharge pressure which remains relatively stable throughout operation of the system. When the water flow is established, the flow of detergent is cut in from container 70, the amount being regulated by needle valve 72 in the supply line. Air is then supplied to the coupling 30 and is further controlled by valve 58 which is used in conjunction with the rotameter 59 and air pressure gage 60. With water, air and detergent being supplied to the mixer nozzle or coupling 30, the air and detergent are drawn into the water stream due to the pressure reduction of the contracted flow (Bernoulli effect). The resultant mixture or emulsion is pumped through the duct system, including headers 22 and branches 24, and forced through discharge orifices 26 where it forms a bubble screen along the exterior length of the ship. As above-described, bubble screens of varying consistency are capable of being produced by virtue of the adjustable air gap feature in the coupling and because of the varying amounts of water, air and detergent that can be added to the mixture.

Obviously many modifications and variations of the present invention are possible in the light of the above teachings. It is therefore to be understood that within the scope of the appended claims the invention may be practiced otherwise than as specifically described.

What is claimed is:

1. A silencing system for a ship comprising a pump adapted for connection to a source of liquid supply, an outlet for said pump discharging into a mixing means where liquid and air are mixed to form an emulsion prior to delivery through a plurality of perforated lines extending between the deck and keel on the ship, the improvement comprising a container for holding a supply of detergent, connecting means attaching said container to said mixing means, and detergent control means interposed between said container and said mixing means for varying the a mount of detergent admitted to said emulsion.

2. A silencing system for a ship having a plurality of perforated lines extending between the deck and keel on said ship, a pump, mixer means connected between said pump and said lines and being provided with an air inlet and a detergent inlet for mixing air and detergent with liquid from said pump to form an emulsion which is pumped through said lines for forming a bubble screen along the length of said ship, the improvement comprising an adjustable nozzle in said mixer means for varying the amount of air mixed with the liquid forming said emulsion, whereby the a mount of air in said emulsion can be varied during normal operation of said system.

3. A silencing system for a ship having a plurality of perforated pipes extending between the deck and keel on said ship, a pump, a mixer having an air inlet and a liquid inlet and outlet, means connecting the discharge end of said pump to said mixer liquid inlet for producing an emulsion which is pumped through said pipes and distributed along the length of said ship for forming a bubble screen therearound, the improvement comprising an adjustable nozzle in said mixer for varying the amount of air introduced into said emulsion, a container attached to said mixer for supplying a detergent to said emulsion, and control means on said container adapted to control the flow of detergent to said mixer.

4. The combination according to claim 3 including indicating means attached to said mixer for determining the amount of air being supplied to said mixer.

5. The combination according to claim 3 comprising viewing means formed in a wall of said mixer for permitting observation of air mixing with liquid in said mixer.

6. A silencing system for a ship having a plurality of perforated pipes extending between the deck and keel on said ship, a pump, a mixer having an air inlet and a liquid inlet and outlet, means connecting the discharge end of said pump with the liquid inlet of said mixer for producing an emulsion which is pumped through said pipes and distributed along the length of said ship for forming a bubble screen therearound, a detachably mounted entrance nozzle in said mixer, a receiving member in said mixer surrounding but spaced from said entrance nozzle for controlling the amount of air mixed with the liquid, a container mounted on said mixer for supplying a detergent to said liquid, control means on said container for varying the flow of said detergent, and viewing means on said mixer for observing the mixing action of said detergent, air and liquid in said mixer.

7. The combination according to claim 6 wherein said receiving nozzle is adjustably mounted on said mixer for varying the air gap between said entrance nozzle and said discharge nozzle for controlling the amount of air flowing therethrough.

8. A method of silencing a water-borne ship by reducing sound radiation therefrom which comprises, flowing air, water and a detergent into intimate contact one with the others in a confined space to thereby form an emulsion, conveying the emulsion so formed to exterior surfaces of the hull of the ship below the water line thereof, and interposing the emulsion between the exterior surfaces of the hull and the water in which the ship is afloat to thereby form a dense uniform bubble screen of relatively low buoyancy in contact with the said exterior surfaces of the ship's hull below the water line thereof.

9. A method of silencing a water-borne ship as set forth in claim 8 which includes the step of varying the ratios of air, water and detergent in the emulsion to thereby vary the density of the bubble screen.

10. A method of silencing a water-borne ship as set forth in claim 8 which includes the step of varying the amount of air flown into the confined space with the water and detergent to thereby vary the density of the bubble screen.

References Cited in the file of this patent

UNITED STATES PATENTS

| | | |
|---|---|---|
| 1,416,950 | Fay | May 23, 1922 |
| 1,697,257 | Anissimoff | Jan. 1, 1929 |
| 1,922,920 | Aherne | Aug. 15, 1933 |
| 2,045,400 | Miller | June 23, 1936 |
| 2,070,562 | Coyne et al. | Feb. 16, 1937 |
| 2,145,463 | Spinanger | Jan. 31, 1939 |
| 2,146,605 | Timpson | Feb. 7, 1939 |
| 2,164,153 | Friedrick | June 27, 1939 |
| 2,183,561 | Hamblin | Dec. 19, 1939 |
| 2,234,631 | Gohre | Mar. 11, 1941 |
| 2,395,944 | Smith | Mar. 5, 1946 |
| 2,754,791 | Nieding | July 17, 1956 |